United States Patent [19]  [11] 3,876,481
Erickson et al.  [45] Apr. 8, 1975

[54] GLASS COMPOSITIONS, FIBERS AND METHODS OF MAKING SAME

[75] Inventors: Thomas D. Erickson, Newark; Warren W. Wolf, Reynoldsburg, both of Ohio

[73] Assignee: Owens-Corning Fiberglas Corporation, Toledo, Ohio

[22] Filed: Mar. 19, 1973

[21] Appl. No.: 340,984

Related U.S. Application Data

[63] Continuation-in-part of Ser. No. 298,703, Oct. 18, 1972, abandoned.

[52] U.S. Cl. .................................. 106/50; 106/52
[51] Int. Cl. ....... C03c 13/00; C03c 3/04; C03c 3/30
[58] Field of Search .............................. 106/50, 52

[56] References Cited
UNITED STATES PATENTS

| 2,394,493 | 2/1946 | Schoenlaub | 106/50 |
| 2,920,971 | 1/1960 | Stookey | 106/52 X |
| 3,095,311 | 6/1963 | von Wranau et al. | 106/50 |
| 3,540,893 | 11/1970 | Petticrew | 106/52 X |
| 3,673,049 | 6/1972 | Giffen et al. | 106/52 X |

FOREIGN PATENTS OR APPLICATIONS

| 124,553 | 6/1947 | Australia | 106/50 |
| 908,074 | 10/1962 | United Kingdom | 106/50 |
| 217,609 | 5/1968 | U.S.S.R. | 106/50 |
| 259,337 | 4/1970 | U.S.S.R. | 106/50 |
| 141,273 | 1/1961 | U.S.S.R. | 106/50 |

Primary Examiner—Patrick P. Garvin
Assistant Examiner—Mark Bell
Attorney, Agent, or Firm—Carl G. Staelin; John W. Overman; Raymond E. Scott

[57] ABSTRACT

Glass compositions are disclosed which are fiberizable and are free of boron and fluorine. The compositions have the following range of proportions (by weight): $SiO_2$, 55 to 63%; $Al_2O_3$, 11 to 18%; CaO, 9 to 25%; $Li_2O$, 0.3 to 2.5%; $TiO_2$, 2 to 5%; MgO, 0 to 10%; MnO, 0 to 1.5%; $Na_2O$, $K_2O$, 0 to 2.5%; BaO, 0 to 2.5%; SrO, 0 to 1.5%; ZnO, 0 to 4%; $ZrO_2$, 0 to 2%; and $Fe_2O_3$, 0 to 1%, wherein the total weight percent of $Li_2O$ and $TiO_2$ is 3.5 to 6.5%. The preferred glass composition has a liquidus temperature of 2200°F., or less, and a viscosity of log 2.5 poises at 2450°F., or less.

7 Claims, No Drawings

GLASS COMPOSITIONS, FIBERS AND METHODS OF MAKING SAME

This application is a continuation-in-part of our co-pending application Ser. No. 298,703 filed Oct. 18, 1972, now abandoned.

BACKGROUND OF THE INVENTION

This invention concerns fiberizable glass compositions which are free of boron and fluorine. Both boron and fluorine are potential air and water pollutants and for this reason are considered undesirable as components of glass compositions, particularly when the glasses are melted in gas-fired furnaces.

Glass fiber compositions which have been used to produce glass fibers suitable for use in textile applications generally contain boron and fluorine as fluxing agents. Boron is commonly put in the composition as colemanite, anhydrous boric acid or boric acid while fluorine is added as $CaF_2$ or sodium silicofluoride ($Na_2SiF_6$). Melting of the glass batch raw materials in gas-fired furnaces to form molten glass from which fibers can be drawn and formed involves heating the batch and molten glass to temperatures in excess of 2200°F. Commonly used textile glasses are melted in the range of 2400° to 2750°F. At these melting temperatures $B_2O_3$ and $F_2$ or various compounds of boron and fluorine readily volatilize out of the molten glass and can be drawn up exhaust stacks and put into the atmosphere surrounding the glass fiber forming area.

The resultant air and perhaps water pollution can be reduced or eliminated by a number of approaches. Water scrubbing or filtering of exhaust gases can often clean up exhaust air. Use of electric furnaces in place of gas-fired furnaces will virtually eliminate the losses of volatile fluxes (e.g. boron and fluorine) commonly associated with gas-fired furnaces at temperatures above 2200°F. These clean-up approaches however are often costly and can be avoided if the source of the pollutants, boron and fluorine, can be removed from the glass compositions. Complicating this solution however is the fact that removing boron and fluorine removes two commonly used ingredients in fiberizable, textile glass compositions. Maintaining acceptable melting rates, melting and operating temperatures, liquids and viscosity in the absence of boron and fluorine can be quite difficult.

An acceptable operating temperatures range in a commercial textile glass feeder or bushing is 2250°-2500°. A glass composition that will operate smoothly in this environment preferably should have a liquidus temperature of 2200°F or less and a viscosity of Log 2.5 poises at a temperature of 2450°F or less.

The fiber forming temperature is preferably about 100° fahrenheit greater than the liquidus temperature to avoid devitrification (crystal growth) in the glass as the fibers are formed. Since devitrification causes irregularities or seeds in the glass, which hamper or stop fiber production, the liquidus temperature of a commercial textile glass should be less than 2200°F.

The viscosity of the molten glass is also a key to efficient and economical fiber forming. Glass viscosities of Log 2.5 poises at a temperature of 2450°F or more require such high temperatures to melt the glass and make it flowable and formable into fibers that the metallic bushings of feeders sag and become unusable or must be replaced or repaired more frequently than when less viscous glasses are used.

With these problems in mind the boron and fluorine free, fiberizable glass compositions of this invention were developed.

SUMMARY OF THE INVENTION

The glass composition of this invention substitutes 3.5 to 6.5% by weight $Li_2O$ and $TiO_2$, total for boron and fluorine as the fluxing agents in fiberizable glass compositions. $Li_2O$ and $TiO_2$, in combination, have a synergistic affect on the preferred glass composition of this invention to lower the viscosity and liquidus temperature of the molten glass to within the preferred viberization range. In the glass composition of this invention, the concentration of $Li_2O$ is 0.3 to 2.5% by weight and 2.4 to 5% by weight $TiO_2$. The preferred glass composition also includes between about 2.5 and 3.5 percent by weight MgO, which further lowers the liquidus temperature of certain glass compositions, as shown in the Examples given below.

The glass compositions and glass fibers of this invention range within the following proportions, wherein the total weight percent of $Li_2O$ and $TiO_2$ ranges from 3.5 to 6.5%, by weight:

| Ingredient | Percent by Weight |
|---|---|
| $SiO_2$ | 55 to 63 |
| $Al_2O_3$ | 11 to 18 |
| CaO | 9 to 25 |
| $Li_2O$ | 0.3 to 2.5 |
| $TiO_2$ | 2 to 5 |
| MgO | 0 to 10 |
| MnO | 0 to 1.5 |
| $R_2O$ ($Na_2O$, $K_2O$) | 0 to 2.5 |
| BaO | 0 to 2.5 |
| SrO | 0 to 1.5 |
| ZnO | 0 to 4 |
| $ZrO_2$ | 0 to 2 |
| $Fe_2O_3$ | 0 to 1 |

Glass compositions falling within this range of proportions will be boron and fluorine free, have a viscosity of Log 2.5 poises at a temperature of 2450°F or less and a liquidus temperature of 2200°F or less. Glass compositions falling within the above range can be drawn into fine, continuous fibers having a diameter of about $15 \times 10^{-5}$ to $55 \times 10^{-5}$ inches.

DESCRIPTION OF THE INVENTION

The glass compositions of this invention and the glass fibers made from them fall within the above broad range of ingredients. A preferred range of ingredients is as follows:

| Ingredient | Percent by Weight |
|---|---|
| $SiO_2$ | 56.7 to 59 |
| $Al_2O_3$ | 12.2 to 14.6 |
| CaO | 16 to 23 |
| $Li_2O$ | 0.4 to 2.5 |
| $TiO_2$ | 2 to 5 |
| MgO | 2 to 3.5 |
| $R_2O$ ($Na_2O$, $K_2O$) | 0 to 0.8 |
| BaO | 0 to 2.5 |
| ZnO | 0 to 4 |
| $ZrO_2$ | 0 to 2 |
| $Fe_2O_3$ | 0 to 1 | the total weight percent of $Li_2O$ and $TiO_2$ in the above ranges from 3.5 'to 6.5%. 6.5%.

Suitable glass fibers consist essentially by weight of

| | Percent |
|---|---|
| $SiO_2$ | 55 to 57 |
| $Al_2O_3$ | 13.5 to 14.5 |
| CaO | 19.5 to 20.5 |
| $Li_2O$ | 0.3 to 2.5 |
| $TiO_2$ | 2 to 4.5 |
| MgO | 2 to 4 |
| $Na_2O$ | 0.5 to 1 |
| $Fe_2O_3$ | 0.1 to 0.5 | and wherein the total weight percent of $Li_2O$ and $TiO_2$ is 3.5 to 6.5%.

Specific glass compositions embodying the principles of this invention are described in the following Table 1, Examples —1 to 16.

well suited for fiber forming at temperatures and in equipment commonly used in commercial fiber forming operations. No expensive new or redesigned equipment is necessary. Higher operating temperatures are not required and therefore bushing wear is not abnormal. Direct replacement of textile glass fiber forming glasses containing boron and fluorine, with boron and fluorine free glasses is therefore possible.

The primary glass forming ingredients in the glass compositions of this invention are $SiO_2$ and $Al_2O_3$.

Lithia ($Li_2O$) and Titania ($TiO_2$) are used in combi-

TABLE 1

| Ingredient | Example No. 1 (% by weight) | No.2 | No.3 | No.4 | No.5 | No.6 | No.7 | No.8 | No.9 | No.10 |
|---|---|---|---|---|---|---|---|---|---|---|
| $SiO_2$ | 59.6 | 57.9 | 56.7 | 56.7 | 56.9 | 57.8 | 56.1 | 56.5 | 58.6 | 57 |
| $Al_2O_3$ | 14 | 14.1 | 14 | 14.1 | 14.1 | 14.1 | 17.9 | 13.9 | 13.8 | 14.1 |
| CaO | 17.7 | 19.2 | 19.3 | 19.6 | 20 | 23.5 | 9.7 | 19.9 | 16.7 | 23 |
| $Li_2O$ | 1.2 | 1.2 | 1.2 | 1.2 | 1.2 | 0.4 | 2.4 | 1.1 | 1.2 | 1.5 |
| $TiO_2$ | 3.7 | 3.7 | 3.7 | 4.3 | 3.7 | 3.8 | 3.9 | 2.4 | 3.6 | 3.7 |
| MgO | 2.8 | 3 | 3 | 3.1 | 3.2 | — | 9.2 | 3.1 | 2.6 | — |
| $Na_2O$ | 0.7 | 0.7 | 0.7 | 0.7 | 0.7 | 0.1 | 0.2 | 0.7 | 0.6 | 0.1 |
| $K_2O$ | 0.1 | 0.1 | 0.1 | 0.1 | 0.1 | 0.1 | 0.2 | 0.1 | 0.1 | 0.1 |
| MnO | — | — | 1.2 | — | — | — | — | — | — | — |
| BaO | — | — | — | — | — | — | — | — | 2.4 | — |
| $ZrO_2$ | — | — | — | — | — | — | — | 2 | — | — |
| $Fe_2O_3$ | 0.3 | 0.3 | 0.2 | 0.2 | 0.2 | 0.2 | 0.4 | 0.21 | 0.3 | 0.2 |
| Liquidus: Temp.,°F. | 2095 | 2100 | 2125 | 2115 | 2110 | 2150 | 2185 | 2175 | 2140 | 2150 |
| Viscosity: Temp.,°F. at Log Poise | | | | | | | | | | |
| 2.0 | 2675 | 2600 | — | 2546 | 2572 | 2650 | 2550 | 2554 | 2652 | 2532 |
| 2.5 | 2440 | 2385 | — | 2335 | 2365 | 2446 | 2340 | 2358 | 2433 | 2330 |
| 2.75 | 2353 | 2297 | — | 2240 | 2280 | 2365 | 2266 | 2285 | 2350 | 2255 |
| 3.0 | — | 2220 | — | — | 2210 | 2295 | 2194 | 2221 | 2268 | 2185 |

| Ingredient | Example No.11 (% by weight) | No.12 | No.13 | No.14 | No.15 | No.16 |
|---|---|---|---|---|---|---|
| $SiO_2$ | 57.5 | 57 | 59 | 62.8 | 57 | 57.3 |
| $Al_2O_3$ | 14.1 | 14.6 | 14.1 | 11.7 | 14.1 | 14 |
| CaO | 22.5 | 22.5 | 21 | 19.6 | 20 | 18.7 |
| $Li_2O$ | 1.5 | 0.5 | 1.5 | 2.4 | 1.5 | 1.2 |
| $TiO_2$ | 3.7 | 3.7 | 3.7 | 2.8 | 3.7 | 3.7 |
| MgO | — | — | — | — | 3.2 | 2.9 |
| $Na_2O$ | 0.1 | 0.1 | 0.1 | 0.2 | 0.1 | 0.7 |
| $K_2O$ | 0.1 | 0.1 | 0.1 | 0.1 | 0.2 | 0.1 |
| MnO | — | — | — | — | — | — |
| BaO | — | — | — | — | — | 1.2 |
| ZrO | — | — | — | — | — | — |
| $Fe_2O_3$ | 0.2 | 0.3 | 0.3 | 0.3 | 0.3 | 0.2 |
| Liquidus: Temp.,°F. | 2135 | 2145 | 2140 | 2200 | 2145 | 2135 |
| Viscosity: Temp.,°F. at Log Poise | | | | | | |
| 2.0 | 2550 | 2575 | 2640 | 2625 | 2520 | 2560 |
| 2.5 | 2350 | 2365 | 2415 | 2392 | 2323 | 2365 |
| 2.75 | 2283 | 2283 | 2330 | 2297 | 2245 | — |
| 3.0 | 21.95 | 2210 | 2245 | 2216 | 2187 | 2215 |

The viscosity determinations in Examples 1 through 16 were obtained using the apparatus and procedure described in U.S. Pat. No. 3,056,283 and in an article in *The Journal of the American Ceramic Society*, Vol. 42, No. 11 November, 1950, pages 537-541. The article is entitled "Improved Apparatus for Rapid Measurement of Viscosity of Glass at High Temperatures" by Ralph L. Tiede. Other specific viscosity determinations referred to herein also would be measured by the apparatus and procedure described in the Tiede article.

The glass compositions of this invention, some of which are described in Table 1, Examples 1, through 16, have a liquidus temperature of 2200°F or less and a viscosity of $10^{2.50}$ poises (log poises 2.50) at a temperature of 2450°F or less. These glasses are therefore nation in the glass composition of this invention as fluxes in place of boron and fluorine. The synergistic effect of the combination of $Li_2O$ and $TiO_2$ to lower the viscosity of the glass composition, without adversely affecting the liquidus, is an important step in producing fiberizable glass compositions which are free of the potential pollutants, boron and fluorine. MgO may also be added to the glass composition to lower the liquidus temperature, if required, to within the fiberization range. The preferred concentrations by weight of $Li_2O$ and $TiO_2$ are 0b 0.3 to 2.5% $Li_2O$ and 2 to 5% $TiO_2$, wherein the total weight percent of $Li_2O$ and $TiO_2$ is 3.5 to 6.5%.

Titania is marketed as a fine white powder, finding extensive use in paints to give opacity to enamels and the like. It is also used in glass decoration. Lithium carbonate (Li$_2$CO$_3$) manufactured from silicate minerals containing lithia, is the principle means of direct introduction of Li$_2$O. The synergistic effect of Li$_2$O and TiO$_2$, as described above, was quite unexpected from the teaching of the prior art.

Magnesium oxide (MgO) is generally considered a comparatively inert constituent of glass compositions and may be added by the raw materials, such as lime and dolomitic lime. MgO has also been known to have an effect on the melting temperature of certain glasses and is added to control the devitrification of diopesides (CaOmgO2SiO$_2$).

Lithia is the only one of the three commonly used alkali metal oxides (Li$_2$O, K$_2$O and Na$_2$O) that can be used in amounts up to 4% by weight to control viscosity without adversely affecting liquidus. In the preferred glass composition of this invention, the range of Li$_2$O is 0.3 to 2.5% by weight. Concentrations of lithia above 2.5% by weight, in combination with TiO$_2$, may cause a raising of the liquidus temperature to undesired levels.

Titania (TiO$_2$) should be used in these glass composition in amounts of 5% by weight or less when used in amounts over about 5%, the TiO$_2$ cause the liquidus to reach undesired levels.

TiO$_2$ in amounts over 5% can also cause a brownish tint or coloration of the glass fibers. This can be a problem where the fibers are combined with a clear matrix material and are visible in the final product. Clear plastic panels or clear plastic fishing rods are examples or products that might be less desirable if tinted fibers were used.

The alkali metal oxides Na$_2$O and K$_2$O can be used individually or collectively to control viscosity. In either case the total of Na$_2$O and K$_2$O should not exceed about 2.5% by weight and preferably not more than 1% by weight. Amounts of Na$_2$O and K$_2$O over 2.5% by weight causes an undesirable raising of the liquidus temperature, which outweighs the advantages these oxides have in keeping viscosity within the desired range.

In Examples 1-5, 8, 9 and 16, Na$_2$O was added as a batch material. In the other Examples Na$_2$O was not added intentionally but entered the glass compositions as an impurity in one of the batch raw materials. K$_2$O entered all of the Examples in Table 1 as a batch material impurity. Glass compositions with no K$_2$O or Na$_2$O would fall within the scope of this invention.

Certain oxides of the RO group, namely BaO, CaO, MgO and MnO are beneficial additions to the glass compositions of this invention. SrO should be equally beneficial. The RO oxides are useful to control liquidus without adversely affecting viscosity. Best results have been found when these RO oxides are used collectively in amounts of 27% by weight or less.

Of the RO oxides listed above, best results are generally obtained when MgO and CaO are used, individually or in combination. It is believed that SrO used individually or in combination with CaO would give similar results.

MnO is preferably used in amounts of 0.5% or less. When used in amounts over 0.5%, MnO can cause a brownish or purple color in the glass composition and fibers.

It has also been found that ZrO$_2$ in amounts up to 2% by weight can be used in the glasses of this invention to increase the chemical durability of the glasses. This increased durability is attributed to the fact that ZrO$_2$, for some reason not fully understood, will inhibit the leaching out of alkali metal oxides from these glasses when the glasses are contacted by water, acids and the like. In this regard it is believed beneficial to add ZrO$_2$ to the glasses of this invention as the amounts of alkali metal oxides increases.

Fe$_2$O$_3$ can enter these glass compositions as an impurity of the batch raw materials or it can be added intentionally in amounts up to 1% by weight. Fe$_2$O$_3$ can however discolor the glass and fibers drawn from the glass, especially in combination with TiO$_2$, and should therefore be kept as low as possible when clear glass fibers are required for some end use. In product applications where clear glass fibers are required, Fe$_2$O$_3$ should be kept at 0.5% by weight or less, and preferably below 0.20.2% % by weight when more than one percent TiO$_2$ is present.

Various other impurities or tramp materials may be present in the glass compositions of this invention in amounts of 0.1% or less by weight without adversely affecting the glasses or fibers. These impurities would include chromic oxide (Cr$_2$O$_3$), oxides of vanadium, sulfates and phosphates. They can enter the glass as raw material impurities or can be products formed by the chemical reaction of the molten glass with the furnace components.

The method of making the fiberizable glass compositions of this invention then consists of adding 0.3 to 2.5% by weight Li$_2$O and 2 to 5% by weight TiO$_2$ to a boron and fluorine free glass composition consisting essentially of SiO$_2$, Al$_2$O$_3$ and CaO in the proportions given above, where the total weight percent of Li$_2$O and TiO$_2$ is 3.5 to 6.5% and melting the batch. The temperature of the molten glass is then reduced to within the fiberization range and fibers are drawn. The methods of fiberizing glass are described in the prior art patents, including U.S. Pat. No. 2,908,036, assigned to the Assignee of the instant application.

Modifications and variations within the scope of the appended claims are intended to be included.

We claim:

1. Fiberizable, boron and fluorine free glass compositions consisting essentially by weight of:

|  | Percent |
|---|---|
| SiO$_2$ | 55 to 63 |
| Al$_2$O$_3$ | 11 to 18 |
| CaO | 9 to 25 |
| Li$_2$O | 0.3 to 2.5 |
| TiO$_2$ | 2 to 5 |
| MgO | 0 to 10 |
| MnO | 0 to 1.5 |
| Na$_2$O, K$_2$O | 0 to 2.5 |
| BaO | 0 to 2.5 |
| SrO | 0 to 1.5 |
| ZnO | 0 to 4 |
| ZrO$_2$ | 0 to 2 |
| Fe$_2$O$_3$ | 0 to 1 | wherein the total weight percent of Li$_2$O and TiO$_2$ is 3.5 to 6.5% and wherein the glass composition has a liquidus temperature of 2200°F, or less, and a viscosity of log 2.5 poises at 2450°F, or less.

2. The glass composition defined in claim 1, wherein the total weight percent of Na$_2$O, K$_2$O and Li$_2$O is greater than one percent and the total weight percent of Na$_2$O and K$_2$O is less than 2.5 percent.

3. The glass composition defined in claim 1, having a concentration of MgO between about 2.5 and 3.5 percent, by weight.

4. Fiberizable, boron and fluorine free glass compositions, consisting essentially by weight of:

| | Percent |
|---|---|
| SiO$_2$ | 56.7 to 59 |
| Al$_2$O$_3$ | 12.2 to 14.6 |
| CaO | 16 to 23 |
| Li$_2$O | 0.4 to 2.5 |
| TiO$_2$ | 2 to 5 |
| MgO | 2 to 3.5 |
| Na$_2$O, K$_2$O | 0 to 0.8 |
| BaO | 0 to 2.5 |
| ZnO | 0 to 4 |
| ZrO$_2$ | 0 to 2 |
| Fe$_2$O$_3$ | 0 to 1 | wherein the total weight percent of Li2O and TiO$_2$ is 3.5 to 6.5% and wherein the glass composition has a liquidus temperature of 2200°F. or less and a viscosity of log 2.5 poises at 2450°F. or less.

5. Boron and fluorine free textile glass fibers, consisting essentially by weight of:

| | Percent |
|---|---|
| SiO$_2$ | 55 to 63 |
| Al$_2$O$_3$ | 11 to 18 |
| CaO | 9 to 25 |
| Li$_2$O | 0.3 to 2.5 |
| TiO$_2$ | 2 to 5 |
| MgO | 0 to 10 |
| MnO | 0 to 1.5 |
| Na$_2$O, K$_2$O | 0 to 2.5 |
| BaO | 0 to 2.5 |
| SrO | 0 to 1.5 |
| ZnO | 0 to 4 |
| ZrO$_2$ | 0 to 2 |
| Fe$_2$O$_3$ | 0 to 1 | and wherein the total weight percent of the oxides Li$_2$O and TiO$_2$ is 3.5 to 6.5% and wherein the glass composition has a liquidus temperature of 2200°F. or less and a viscosity of log 2.5 poises at 2450°F. or less.

6. Textile glass fibers consisting essentially by weight of:

| | Percent |
|---|---|
| SiO$_2$ | 55 to 57 |
| Al$_2$O$_3$ | 13.5 to 14.5 |
| CaO | 19.5 to 20.5 |
| Li$_2$O | 0.3 to 2.5 |
| TiO$_2$ | 2 to 4.5 |
| MgO | 2 to 4 |
| Na$_2$O | 0.5 to 1 |
| Fe$_2$O$_3$ | 0.1 to 0.5 | and wherein the total weight percent of Li$_2$O and TiO$_2$ is 3.5 to 6.5%.

7. The method of making a fiberizable glass composition, by adding 0.3 to 2.5% by weight Li$_2$O and 2 to 5% by weight TiO$_2$ to the following boron and fluorine free glass composition, consisting essentially of, by weight:

| | Percent |
|---|---|
| SiO$_2$ | 55 to 63 |
| Al$_2$O$_3$ | 11 to 18 |
| CaO | 9 to 25 |
| MgO | 0 to 10 |
| MnO | 0 to 1.5 |
| Na$_2$O, K$_2$O | 0 to 2.5 |
| BaO | 0 to 2.5 |
| SrO | 0 to 1.5 |
| ZnO | 0 to 4 |
| ZrO$_2$ | 0 to 2 |
| Fe$_2$O$_3$ | 0 to 1 | and wherein the total weight percent of Li$_2$O and TiO$_2$ is 3.5 to 6.5%, and melting said glass composition and wherein the glass composition has a liquidus temperature of 2200°F. or less and a viscosity of log 2.5 poises at 2450°F. or less.

* * * * *